US007669706B2

(12) United States Patent
McLaughlin et al.

(10) Patent No.: US 7,669,706 B2
(45) Date of Patent: Mar. 2, 2010

(54) TRAY HANDLING SYSTEM AND PROCESS

(75) Inventors: Jason G. McLaughlin, Owego, NY (US); Hajime Morikawa, Tokyo (JP); Michael A. Wisniewski, Owego, NY (US)

(73) Assignee: Lockhead Martin Corporation, Bethesda, MD (US)

( * ) Notice: Subject to any disclaimer, the term of this patent is extended or adjusted under 35 U.S.C. 154(b) by 1089 days.

(21) Appl. No.: 11/007,217

(22) Filed: Dec. 9, 2004

(65) Prior Publication Data

US 2006/0124513 A1 Jun. 15, 2006

(51) Int. Cl.
*B65G 47/00* (2006.01)

(52) U.S. Cl. .................... 198/349; 198/347.4; 198/433; 198/447; 209/584; 209/900

(58) Field of Classification Search .............. 198/347.4, 198/349, 433, 447, 465.1
See application file for complete search history.

(56) References Cited

U.S. PATENT DOCUMENTS 3,884,370 A * 5/1975 Bradshaw et al. ........... 198/350
4,106,636 A * 8/1978 Ouimet et al. .............. 198/350
4,244,672 A * 1/1981 Lund .......................... 198/350
5,009,321 A 4/1991 Keough
5,901,855 A * 5/1999 Uno et al. .................. 209/584
5,924,576 A 7/1999 Steenge
5,959,868 A 9/1999 Oppliger et al.
6,026,967 A 2/2000 Isaacs et al.
6,183,191 B1 2/2001 Mondie et al.
6,276,509 B1 8/2001 Schuster et al.
6,316,741 B1 11/2001 Fitzgibbons et al.
6,501,041 B1 12/2002 Burns et al.
6,555,776 B2 4/2003 Roth et al.
6,561,339 B1 5/2003 Olson et al.
6,595,346 B1 7/2003 Advani et al.
6,598,748 B2 7/2003 Mileaf et al.
2002/0023861 A1 2/2002 Mileaf et al.
2002/0125177 A1* 9/2002 Burns et al. ................. 209/630
2002/0139726 A1 10/2002 Roth et al.
2003/0141226 A1 7/2003 Morikawa
2003/0155282 A1 8/2003 Kechel

* cited by examiner

*Primary Examiner*—Gene Crawford
*Assistant Examiner*—Kavel P Singh
(74) *Attorney, Agent, or Firm*—Leland Schultz; Greenblum & Bernstein P.L.C.

(57) ABSTRACT

A device and method for sequencing trays includes a tray receiving conveyor and a recirculating conveyor. Trays are placed on the recirculating conveyor and merged with ejected trays into a multiple of sequenced trays at one or more merge locations. The system can include more than one merge location, with one of the merge locations providing a merge of trays into a contiguous sequence of trays.

7 Claims, 3 Drawing Sheets

TRAY HANDLING SYSTEM AND PROCESS

FIELD OF THE INVENTION

The invention generally relates to a tray handling system and method of use and, more particularly, to a recirculating tray handling system and method of use for sequencing streams of trays or containers, for example.

BACKGROUND DESCRIPTION

The sorting of mail is a very complex, time-consuming task. In general, the sorting of mail is processed though many stages, including back end processes, which sort or sequence the mail in delivery order sequence. These processes can either be manual or automated, depending on the mail sorting facility, the type of mail to be sorted such as packages, flats, letters and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced tray conveyors, flat sorters and the like. As a result of these developments, postal facilities have become quite automated over the years, considerably reducing overhead costs.

But, in implementation, it may still be time consuming and labor intensive to obtain a final sequence of the mail products, even using the most sophisticated sorting algorithms. For example, currently, it is known to sequence letters using-a mail sorter based on, for example, a two-pass algorithm. Of course, other known systems can equally be used to sort mail product, a host of them readily available and known to those of ordinary skill in the art.

For example, in a typical sequencing of mail product, the mail product is fed through feeders and transported into trays located within bin locations (for a sort). The trays may be labeled, and as they are filled, removed from the system and placed outside of the feeder system, only to be manually brought back to the feeders for a second pass sequencing process. In other known systems, the trays are directed to individual storage lanes using right angle transfers and buffer lanes, at great expense to the facility. In either situation, this is a very time consuming, labor intensive and expensive procedure. Also, the use of the separate storage lanes or physically removing trays from the system requires additional storage or flooring space. This also adds to the overhead of the facility, increasing processing costs.

The invention is directed to overcoming one or more of the problems as set forth above.

SUMMARY OF THE INVENTION

In a first aspect of the invention, a device for sequencing trays includes a tray receiving conveyor, which receives trays output from bin locations. A recirculating conveyor buffer system has one or more merge locations and is configured to recirculate staged trays and coordinate merging of the staged trays with newly ejected trays into a multiple of sequenced trays at the one or more merge locations.

In another aspect of the invention, a method of sequencing trays includes placing at least one tray into a flow path in response to a triggering event and recirculating the at least one tray to a merging location. Other trays are placed in the flow path in response to the triggering event, and merged with the at least one tray into sequence as they pass the merging location.

In yet another aspect of the invention, the method includes a preliminary and final sweep operation. In the preliminary sweep operation, newly ejected trays are directed from queued bin locations to a first merge location and staged trays previously ejected are diverted towards the first merge location. The newly ejected trays and the staged trays are coordinated in movement such that the newly ejected trays are merged with the staged trays at the first merge location into a sequenced set of trays. In the final sweep operation, the sequenced set of trays are diverted away from the first merge location and towards a second merge location. Remaining trays are ejected from working bin locations and the queued bin locations and are diverted towards the second merge location. The remaining trays and the sequenced trays are placed in a contiguous sequence as they pass though the second merge location.

In yet another aspect of the invention, a mail sorting system includes at least one mail feeder feeding mail to trays located in bin locations comprising a working area and at least one queued area. A tray receiving conveyor receives the trays ejected from the at least one queued area in response to a triggering and qualification event. The sorting system further includes recirculating conveyor buffer system having at least two merge locations and at least two diverting locations downstream from the at least two merge locations, respectively. A controller instructs the system to provide controlled movement of the trays ejected at different processing operations from the queued area as they pass through merge locations and the diverting locations in order to sequence the trays into a sequence.

A machine readable medium containing code includes at least one module for performing the steps of the method(s).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EMBODIMENTS OF THE INVENTION

The invention is directed to a tray handling system and more particularly to a system and method for placing trays in a contiguous sequence using a recirculating system. The tray handling system merges trays into a stream of trays during a sorting and/or sequencing process of products such as, for example, flats and other mail items (i.e., letters), into a merged, contiguous sequenced stream of trays for future delivery or warehousing or the like.

In aspects of the invention, the tray handling system uses a unique merging process and system to sequence the trays during the sorting and sequencing of the product. This invention thus eliminates the need to store trays outside the system, and additionally eliminates the need for individual storage lanes using, for example, right angle transfers and buffer lanes. The system and method of the invention also significantly reduces processing times for sequencing the product, as well as allows for parallel processing, as discussed below. Other applications such as warehousing and storage applications are also contemplated for use with the invention.

Tray Handling System of the Invention

Figure 1:
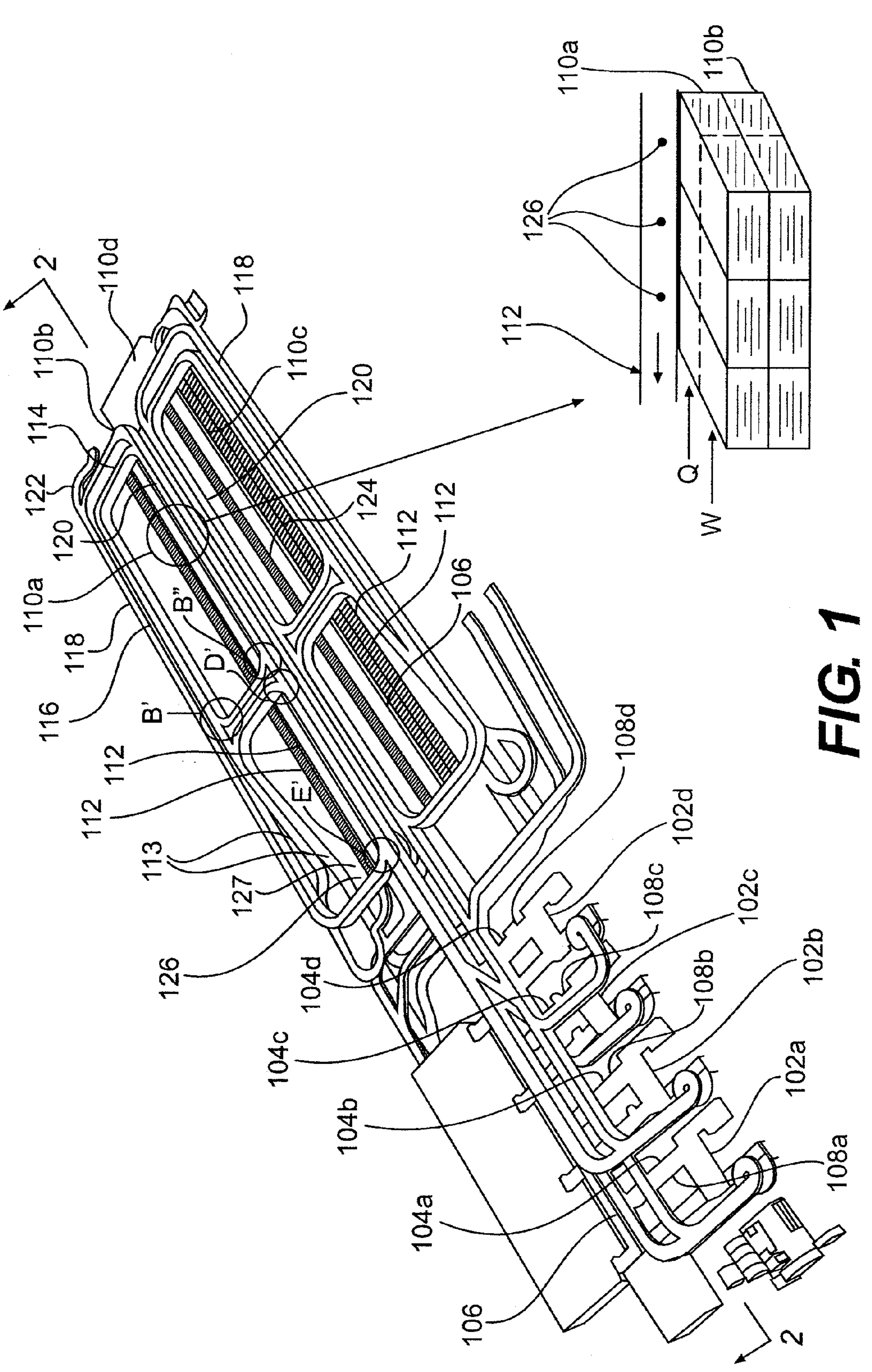
FIG. 1 shows a schematic diagram of an embodiment of a sorting device in accordance with the invention.

Referring now to FIG. 1, a schematic diagram of the tray handling system of the invention is shown. In the embodiment of FIG. 1, the tray handling system is generally depicted as reference numeral 100 and includes, in one embodiment, four feeders 102*a*, 102*b*, 102*c* and 102*d*. The feeders may be a combination of letter feeders and flat feeders, with a feed rate capacity of approximately 40,000 letters per hour and approximately 10,000 flats per hour, respectively. Those of ordinary skill in the art should recognize, though, that other types of feeders, feeding capacity rates and the like may also be used with the invention, and that the feeders 102*a*-102*d* shown in FIG. 1 are provided for illustrative purposes in describing the invention. Additionally, it should further be recognized that more or less than four feeders are also contemplated for use with the invention.

Referring still to FIG. 1, conveying tracks 104*a*, 104*b*, 104*c* and 104*d* are associated with the feeders 102*a*-102*d*, respectively. These conveying tracks 104*a*-104*d* may be parallel belt transports, pocket/cartridge transports or any other well known conveying or transporting system for transporting the product to a carousel transport 106.

A camera, optical reading device such as an optical character recognition (OCR), bar code scanner or other type of reading device 108 is provided downstream of the feeders 102*a*-102*d*. A controller "C" provides control to the system, including the sorting and sequencing of the products, as well as the movements and sequencing of the trays.

In embodiments, the cameras or other reading type devices 108 may be mounted to the respective conveying tracks 104*a*-104*d*, but may be located near or proximate to the conveying tracks 104*a*-104*d*. The cameras or reading devices are designed to read the delivery point or other pertinent product information provided on each product. In use, by way of one example, the cameras or other reading type devices 108 communicate with the controller "C" via an Ethernet, Local Area Network, Wide Area Network, Intranet, Internet or the like. The cameras or other reading type devices 108 will capture information such as, for example, address destination information, from the product and send this captured information to the central processing unit (e.g., controller "C") for interpretation and analysis, e.g., to determine sorting and sequencing information using any well known process such as, for example, a two pass sequencing algorithm.

FIG. 1 further shows four bin sections 110*a*, 110*b*, 110*c* and 110*d*, each including bin locations adjacent to the carousel transport 106. In embodiments, the bins sections 1 10*a*, 110*b* and 110*c*, 110*d* are located on respective levels, with a substantially same configuration. Alternatively, the bin sections may be expanded on a same level or in other configurations resulting in a different footprint. The bin locations are each capable of holding at least two trays such as, for example, a working tray in a working area (W) and a queued tray in a queued area (Q). The working tray is preferably the tray adjacent to the carousel transport 106 for product to be placed therein in a sort or sequence order; whereas, the queued tray is positioned remotely from the carousel transport 106 and adjacent the working tray. In embodiments, the tray in the queued area (Q) includes a predetermined amount of product therein such as, for example, a fill tray, in the sort or sequence order.

It should be understood, though, that each bin location could also hold more than two trays, depending on the particular required output of the system. In any case, the bin sections, in one embodiment, may include upwards or exceed 90 bin locations per section, each receiving product from a feeder 102*a*-102*d* in sort or sequence order under control of the controller "C" (using any well known process). In a first sort process, the bin locations can receive product from any feeder; whereas, in a second sort process, it is preferable that each of the bin locations receive product only from one respective feeder.

The bin sections 110*a*-110*d* are adjacent to a respective full tray conveyor, generally denoted as reference numeral 112. The respective full tray conveyors 112 may be provided on multiple levels or on a same level, depending on the corresponding configuration of the respective bin sections 10*a*-10*d*. The trays in each of the bin locations may be transported onto the respective full tray conveyor 112 by a conventional gravity roller feeder or a corresponding conveying system at each of the bin locations, denoted by reference numeral 114. As the designation implies, the full tray conveyors 112 transport full trays to, for example, a buffer system 116 associated with each of the feeders (and hence each bin section 110*a*-110*d*) for future, concurrent or simultaneous sequencing of trays. In some embodiments, for example, when no further product are available for sorting and sequencing, the full tray conveyors 112 will transport trays which may not be completely filled with product.

Still referring to FIG. 1, the full tray conveyors 112 can be any conventional type conveying system such as a power roller, belt or roller driven conveyor. The full tray conveyors 112, in embodiments, may also include zone controls such that each zone may be individually controlled. In this manner, each tray placed on the full tray conveyors may be moved independent of any other tray. Additionally, in one implementation, each of the full tray conveyors 112 receive the trays from the respective bin sections 110*a*-110*d* upon a triggering event and qualification, under command of the controller "C".

The full tray conveyors each lead to a respective recirculating buffer, generally denoted as reference numeral 116. In one embodiment, elevated conveyor 113 span between the respective full tray conveyors 112 and recirculating buffers 116. Although not critical to the understanding of the invention, in use, the elevated conveyors may be used to decrease the footprint of the system, thus decreasing the use of flooring space. The recirculating buffer, inclined conveyors, as well as any other flow path can be any conventional type conveying system such as a power roller, belt or roller driven conveyor, and may include individually controlled zones.

In further embodiments, the recirculating buffers 116 each include, in an embodiment, merge points B' and B" for each level, although more recirculating sections may also be used depending on the amount of feeders. A loop back or recirculation of the products may also be provided by respective tray staging and output conveyor, generally denoted as reference numeral 118, starting at diverting point E'. The tray staging and output conveyors 118 transport the trays to the feeders 102*a*-102*d* by means of a second pass tray return conveyor 120 or to an output 122. The second pass tray return conveyor 120 may also include individually controlled zones. Additionally, empty tray conveyor 124 may convey empty trays to the bin sections 110*a*-110*d*, and more particularly to each bin location as required.

In one implementation, the controller "C" may be used to determine the amount of product in the tray using logic based on the amount of product initially ejected from the feeders and its known destination location at any of the bin locations.

Alternatively, sensor(s) 126 may be positioned near each of the bin locations to determine whether the tray is full, or other amount of product is in the tray. The sensors 126 may be a diffuse sensor, photodiode or a weight sensor which, upon sensing the amount of product within a tray, will activate and deactivate the conveying system 114. The amount of product within the tray may be a triggering event and qualification occurrence, as discussed below.

Another sensor 127 such as an OCR or barcode scanner may also be located near the bin locations in order to read labels placed on the trays, such as the bin location or sorting criteria information. The sensor 127 may also be positioned at the merge and divert locations. The controller "C" may then use this information in order to maintain track of the trays throughout the system, as discussed further below.

As should be understood, the number of bin sections and corresponding conveyor systems, e.g., recirculating buffers, full tray conveyors, as well as merge and/or diverting locations, preferably correspond to a respective number of feeders. However, it should be recognized that more or less than four feeders and corresponding components may be used within the scope and spirit of the invention. For example, the invention will work in substantially the same manner as described herein, but with less throughput, using one feeder, e.g., 102*a*, with a corresponding bin section, e.g., 110*a* and conveyor systems. In some implementations, more than one feeder may be used with a single bin section and corresponding components.

Method of Sequencing Trays using the System of the Invention

The system of the invention may be used for a single carrier route at a time, multiple routes at once or for warehousing or other sequencing needs of any type of products. For illustrative purposes and not to limit the invention in any manner, a single route sequencing will be described as an illustrative example.

Figure 2:
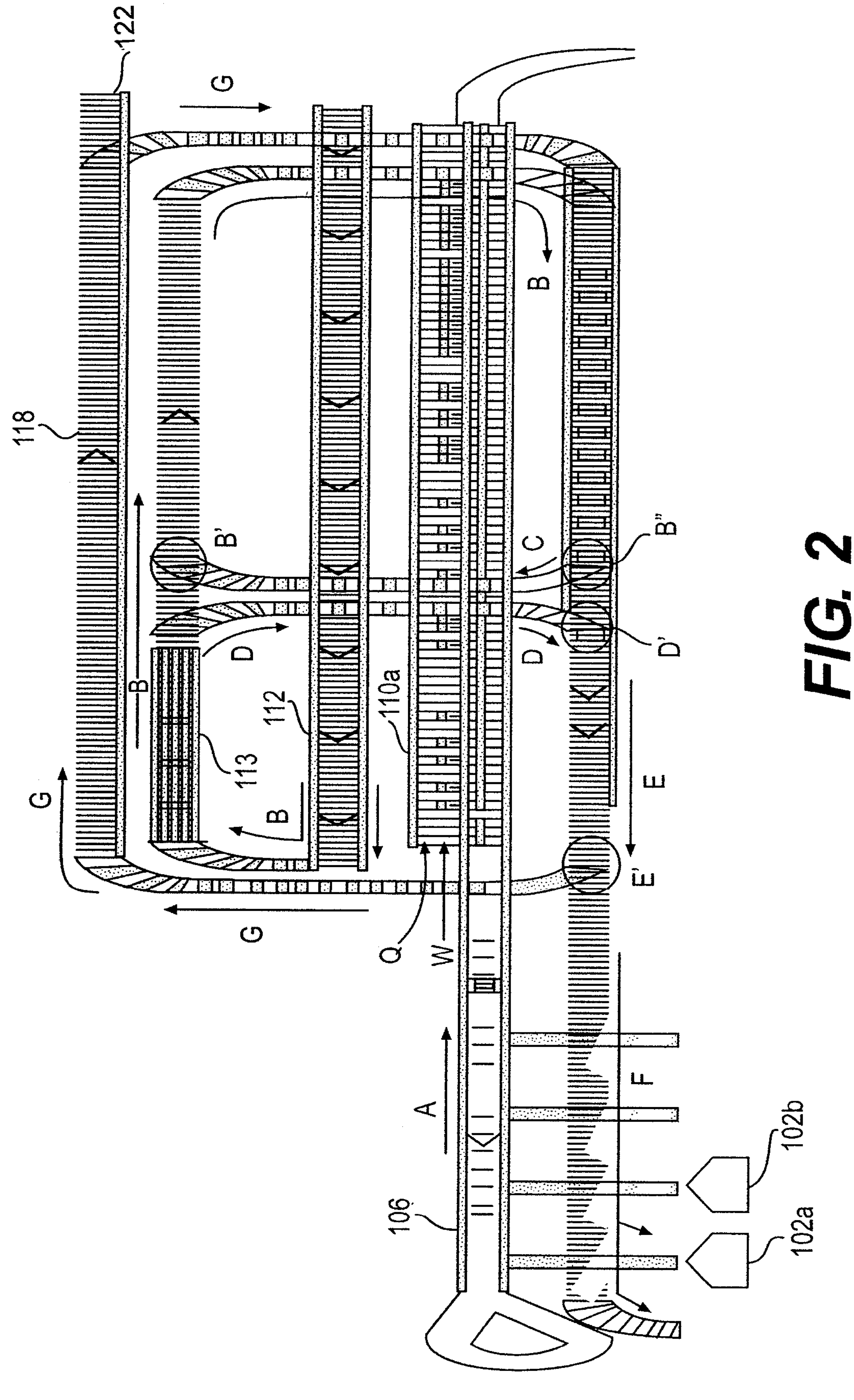
FIG. 2 shows a feed path of trays in accordance with the invention.

FIG. 2 is a cut-away view of the system of FIG. 1, along lines 2-2. This view shows the feed paths of product and trays within the system and is used to provide an illustrative example of the processes of the invention. In this feed path illustration, the product is shown to be fed to a single bin section 110*a*; although, this process is equally applicable for any bin sections 110*a*-110*d*. Initially, the product will be fed from feeder along path "A" on the carousel transport 106 to the appropriate bin locations of any of the bin sections 110*a*-110*d*, each adjacent to the carousel transport 106. In the scenario of FIG. 2, the product will be received at bin section 102*a*. The product is then placed within an appropriate working tray in a sort order, based on the control of the system.

In FIG. 2, for illustration, after the working tray is filled or includes a predetermined amount of product in any of the bin locations of bin section 100*a*, it will be moved to the queued area (Q), at which time an empty tray will be placed in the working area (W). This process may occur for any of the bin locations, and may include any amount of queued areas. The fill capacity rate of the trays may vary, in which case the controller "C" will still provide the same functionality as described.

Upon a triggering event and a qualification, certain trays in the queued areas (Q) will be moved in a sequence from the queued areas (Q) of the bin locations to the respective full tray conveyor 112*a*, where they will be transported onto the recirculating buffer 116. By way of illustration, during the 1$^{st}$ preliminary sweep, the triggering event for moving trays to the recirculating buffer 116 may include, for example, (i) a tray being filled 80% in the working area (W) and (ii) a tray being in the queued area (Q) in the same bin location.

Once the triggering event occurs, the control will also determine whether additional trays in other bin locations are qualified for ejection. For example, in one embodiment, the qualification may be any tray in a remaining bin location having a 50% or more filled tray in the working area (W) and a tray in the queued area (Q). Once the triggering event and qualification has occurred, all trays within the queued area (Q) associated with the triggering event and qualification are ejected onto the full tray conveyor. It should be recognized that different triggering events and qualification occurrences are further contemplated by the invention, and that the example provided herein is not to be construed as a limiting feature but as an illustrative example.

By way of one further illustration, using a system with 10 bin locations and one working area (W) and one queued area (Q) for each bin location, the following situation may exist:

| Q (fill %) | NT | 100% | NT | NT | 100% | 100% | 100% | NT | 100% | 100% |
|---|---|---|---|---|---|---|---|---|---|---|
| W (fill %) | 10% | 50% | 10% | 10% | 80% | 10% | 50% | 50% | 10% | 50% |
| Bin Location | 1 | 2 | 3 | 4 | 5 | 6 | 7 | 8 | 9 | 10 |

NT = no tray.

In this example, the triggering event will be at the 5$^{th}$ bin location, which includes an 80% filled tray in the working area (W) and a 100% filled tray in the queued area (Q). During this 1$^{st}$ preliminary sweep, the trays in the queued area (Q) of the 2$^{nd}$, 7$^{th}$ and 10$^{th}$ bin locations will also be qualified for ejection based on the 50% and 100% filled trays, respectively, in the working area (W) and the queued area (Q). With these events, the trays located within the queued areas (Q) of the 2$^{nd}$, 5$^{th}$, 7$^{th}$ and 10$^{th}$ bin locations will be transported, in sequence, to the recirculating buffer 116, via the full tray conveyor 112.

The trays on the recirculating buffer 116 may then follow feed path B, past merge point B'. The trays will then be diverted at diversion point B", to feed path C. During these stages, products may be simultaneously fed from the feeders along path "A" into the trays in the working area (W). So, following the example, provided above, the trays in the working area (W) may continue to be filled and appropriately moved into the queued area (Q).

The system waits for another triggering event to occur in order to provide a 2$^{nd}$ preliminary sweep, i.e., move the filled trays in the queued area (Q) onto the recirculating buffer 116; as described above. By way of illustration, the next triggering event may result from the following situation:

| | | | | | | | | | | |
|---|---|---|---|---|---|---|---|---|---|---|
| Q (fill %) | 100% | 100% | NT | 100% | 100% | 100% | NT | 100% | 100% | NT |
| W (fill %) | 10% | 50% | 20% | 55% | 10% | 50% | 60% | 10% | 80% | 60% |
| Bin Location | 1 | 2 | 3 | 4 | 5 | 6 | 7 | 8 | 9 | 10 |

In this example, the triggering event will be at the $9^{th}$ bin location, which includes an 80% filled tray in the working area (W) and a 100% filled tray in the queued area (Q). The trays in the queued area (Q) of the $2^{nd}$, $4^{th}$ and $6^{th}$ bin locations will also be qualified for ejection based on the at least 50% tray fill and the 100% tray fill in these locations. With the triggering event and qualification, the trays located within the queued areas (Q) of the $2^{nd}$, $4^{th}$, $6^{th}$ and $9^{th}$ bin locations will be ejected and transported, in sequence, to the recirculating buffer 116.

In the $2^{nd}$ preliminary sweep, the trays from the $2^{nd}$, $4^{th}$, $6^{th}$ and $9^{th}$ bin locations may then follow feed path B. As trays pass merge point B', the trays from the $2^{nd}$, $5^{th}$, $7^{th}$ and $10^{th}$ bin locations moving along feed path C, will begin to merge with the trays from the $2^{nd}$, $4^{th}$, $6^{th}$ and $9^{th}$ bin locations. The trays from the $2^{nd}$, $4^{th}$, $5^{th}$, $6^{th}$, $7^{th}$, $9^{th}$ and $10^{th}$ bin locations will now be in sequence, all in feed path B. As discussed above, the zoned conveyor may individually move the trays.

In one implementation, the trays may be labeled with indicia such as the bin location or sorting criteria, which can then be read by a sensor such as sensor 127 (which may equally be an OCR or bar scanner). The sensor 127 may be located in the feed path of the trays prior to the merge and divert points for flow control of the product. This read information can then be relayed to the controller "C", which maintains track of the relative positions of each of the trays, and directs movement and coordination of the feed paths of the conveyers (based on this information) such that the following will occur:

the $1^{st}$ tray from the $2^{nd}$ bin location will be transported past the merge point B', remaining in the feed path B;

the $2^{nd}$ tray from the $2^{nd}$ bin location will be transported via feed path C past the merge point B', and placed immediately after the $1^{st}$ tray from the $2^{nd}$ bin location;

the tray from the $4^{th}$ bin location will be transported past the merge point B', and placed immediately after the tray from the $2^{nd}$ tray of the $2^{nd}$ bin location;

the tray from the $5^{th}$ bin location will be transported via feed path C past the merge point B', and placed immediately after the tray from the $4^{th}$ bin location;

the tray from the $6^{th}$ bin location will be transported past the merge point B', and placed immediately after the tray from the $5^{th}$ bin location;

the tray from the $7^{th}$ bin location will be transported via feed path C past the merge point B', and placed immediately after the tray from the $6^{th}$ bin location;

the tray from the $9^{th}$ bin location will be transported past the merge point B', and placed immediately after the tray from the $7^{th}$ bin location; and the tray from the $10^{th}$ bin location will be transported via feed path C past the merge point B', and placed immediately after the tray from the $9^{th}$ bin location.

The trays from the $2^{nd}$, $4^{th}$, $5^{th}$, $6^{th}$, $7^{th}$, $9^{th}$ and $10^{th}$ bin locations are now in sequence, all in feed path B, after merge point B'. This same process will continue for subsequent preliminary sweeps until no more products need to be sorted. Accordingly, the system and method of the invention, depending on the product count may provide more than two preliminary sweeps. Also, during this sequencing of trays, products may still simultaneously be fed from the feeders along path "A" into the trays in the working area.

It should be noted that a preliminary sweep operation may not be necessary due to a limited number of product being sorted by the system. In such scenario, the operations will go directed to a final sweep operation. For example, the $1^{st}$ preliminary sweep operation will be replaced with a final sweep operation based on a limited product count. In this situation, there will be no requirement for any preliminary sweep, e.g., a $1^{st}$, $2^{nd}$, etc. preliminary sweep. In any case, when no further product for the initial sort remains, a last triggering event prompts the removal of the remaining trays in the final sweep operation. In the final sweep operation for the sort, the remaining last trays having sorted product therein will follow feed path B to feed path D. Using the previous example, at merge point D', these remaining trays will begin to merge with the trays of the $2^{nd}$, $4^{th}$, $5^{th}$, $6^{th}$, $7^{th}$, $9^{th}$ and $10^{th}$ bin locations, already merged in sequence.

By way of further example, the following tray fill is provided.

| | | | | | | | | | | |
|---|---|---|---|---|---|---|---|---|---|---|
| Q (fill %) | 100% | NT | NT | NT | 100% | NT | NT | NT | NT | 100% |
| W (fill %) | 40% | 50% | 20% | 55% | 20% | 50% | 60% | 10% | 10% | 10% |
| Bin Location | 1 | 2 | 3 | 4 | 5 | 6 | 7 | 8 | 9 | 10 |

In this sequencing operational stage, (i) both trays from the $1^{st}$, $5^{th}$ and $10^{th}$ bin locations and (ii) one tray from the $2^{nd}$-$4^{th}$ and $6^{th}$-$9^{th}$ bin locations will be moved in sequence into feed path B, regardless of the amount of product therein. That is, these trays will be moved into the feed path B of the conveyor 113 in the order of bin locations $1^{st}$, $1^{st}$, $2^{nd}$, $3^{rd}$, $4^{th}$, $5^{th}$, $5^{th}$, $6^{th}$, $7^{th}$, $8^{th}$, $9^{th}$, $10^{th}$ and $10^{th}$. These trays will then be merged with the remaining trays at merge point D', similar to that described above. In this manner, the following contiguous sequence of trays will result: trays of the bin locations $1^{st}$, $1^{st}$, $2^{nd}$, $2^{nd}$, $2^{nd}$, $3^{rd}$, $4^{th}$, $4^{th}$, $5^{th}$, $5^{th}$, $5^{th}$, $6^{th}$, $6^{th}$, $7^{th}$, $7^{th}$, $8^{th}$, $9^{th}$, $9^{th}$, $10^{th}$, $10^{th}$ and $10^{th}$, all eventually leading to the feeders along feed path E and feed path F. In one implementation, the trays originating from the same bin location will be placed in a contiguous order in the respective sweep operations, e.g., $1^{st}$ preliminary sweep, $2^{nd}$ preliminary sweep final sweep.

Now, the sequenced trays will be conveyed to the feeders along feed path E and feed path F for final sequencing of the product. However, the feeding capacity of the feeders may not have the throughput to initially process all of the product within the trays as they are presented to the feeders. In this event, the controller "C" will divert the product along feed path G into the tray staging and output conveyor 118, which acts as a staging area. As the feeders are able to process the product, the trays will then follow feed path E to feed path F, leading to the feeders. For example, using the above illustration and assuming the feed path F can accommodate 10 trays:

The feeders will initially process trays from the $1^{st}$, $1^{st}$, $2^{nd}$, $2^{nd}$, $2^{nd}$, $3^{rd}$, $4^{th}$, $4^{th}$, $5^{th}$, $5^{th}$ bin locations and the remaining trays associated with the $5^{th}$, $6^{th}$, $6^{th}$, $7^{th}$, $7^{th}$, $8^{th}$, $9^{th}$, $9^{th}$, $10^{th}$, $10^{th}$ and $10^{th}$ bin locations will be diverted to feed path G.

During the above operational phase, merging of additional trays may continue at merge point D'. For example, trays from bin locations at or above the $5^{th}$ bin location may be merged with the sequenced trays associated with the $5^{th}$, $6^{th}$, $6^{th}$, $7^{th}$, $7^{th}$, $8^{th}$, $9^{th}$, $9^{th}$, $10^{th}$, $10^{th}$ and $10^{th}$ bin locations flowing from feed path B (after merge point B").

As the feeders process the trays from the $1^{st}$, $1^{st}$, $2^{nd}$, $2^{nd}$, $2^{nd}$, $3^{rd}$, $4^{th}$, $4^{th}$, $5^{th}$, $5^{th}$ bin locations, the remaining trays will be routed about feed path G to feed path B and feed path E. During this operational phase, the trays from the, $5^{th}$, $6^{th}$, $6^{th}$, $7^{th}$, $7^{th}$, $8^{th}$, $9^{th}$, $9^{th}$, $10^{th}$, $10^{th}$ and $10^{th}$ bin locations will convene with the previous trays along feed path F (or feed path B or feed path E), depending on the throughput of the feeders. Now, all of the trays will be in queue for processing by the feeders.

As the feeders process the product, the product will again follow the feed path A for a final sequencing. This may occur, in some embodiments, while product is still within the queued bin areas (Q) during the final sweep of the sorting process stage. In this feed path A, the product are again fed from the feeders to the appropriate bin locations of the bin sections, each adjacent to the carousel transport 106. The product is then placed within an appropriate working tray. However, the product now is in a delivery sequence order, based on a two pass algorithm control, for example.

As described with respect to the sorting process, after the working tray is filled or includes a predetermined amount of product it will be moved to the queued area (Q), at which time an empty tray will be placed in the working area (W), if necessary. This process may occur for any of the bin locations, and may include any amount of queued areas (Q). Upon the triggering event and qualification process, certain trays in the queued areas (Q) will be moved in a sequence from the queued areas (Q) of the bin locations to the respective full tray conveyor, where they will be transported onto the recirculating buffer 116 for sequencing of the trays, as described above.

However, in implementation during the final sweep of the product in the sequencing process stage, all of the trays will be merged at merge point D' and then directed to the appropriate tray staging and output conveyor following feed path G, under control of the controller "C". During this last or final sweep, the trays are now in a contiguous sequence and can be ejected from the system at outputs 122.

Figure 3:
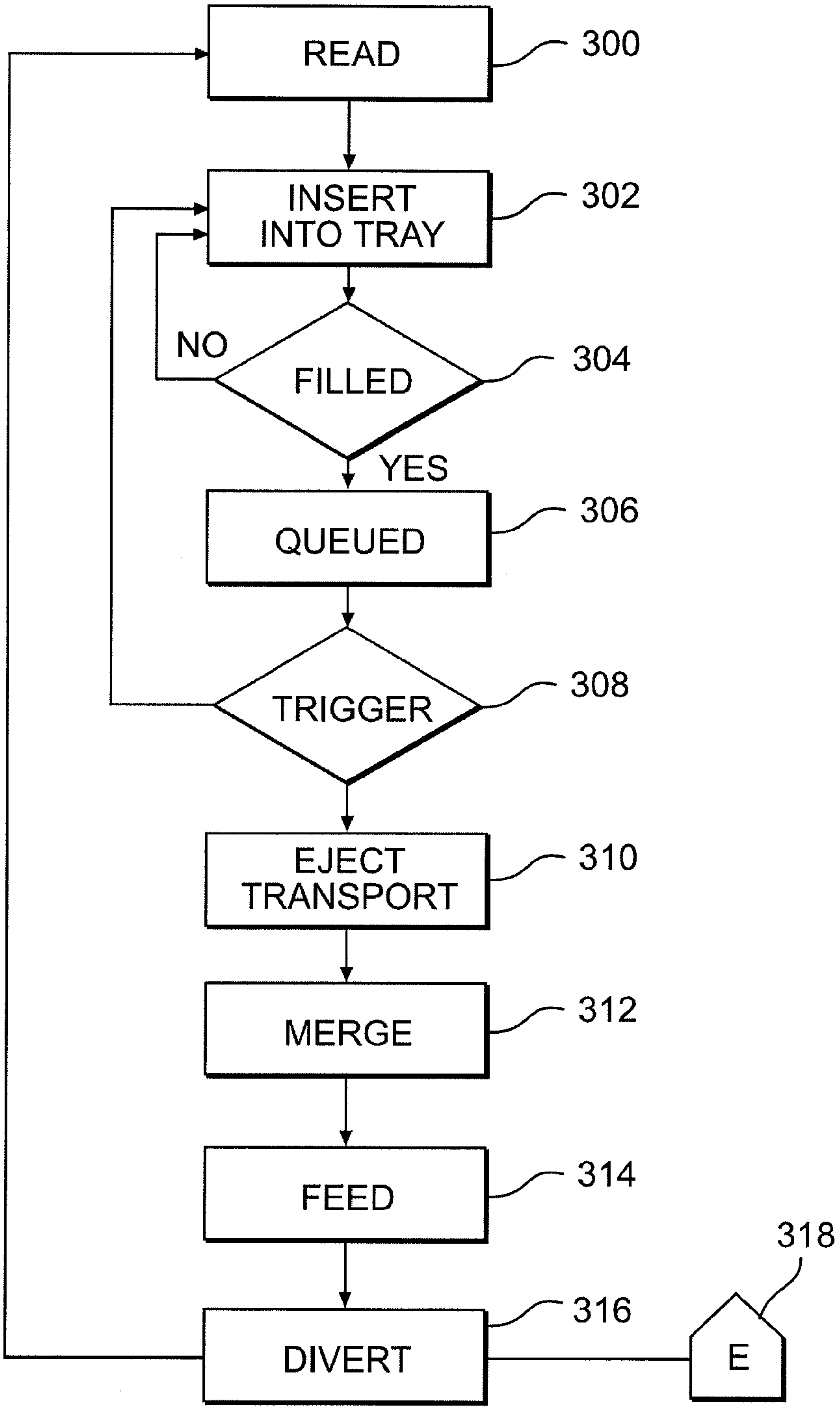
FIG. 3 is a flow diagram showing steps implementing the method of the invention.

FIG. 3 is a flow diagram showing the steps of implementing the method of the invention. The steps of the invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). FIG. 3 may equally represent a high level block diagram of the system of the present invention, implementing the steps thereof.

In particular, at step 300, the reading devices read the destination or delivery point information or other product information (generally referred to as delivery point information) of the products as they are ejected from each of the feeders. The delivery point information may include, for example, any indicia, key, code (i.e., 11 digit post code) or the like for showing an association between the products such as for warehousing, storing or the like. This information is then captured by the controller and used to divert the product to the specific bin locations for sorting and sequencing of the product, as is known in the art.

At step 302, the product is directed to the appropriate bin location and inserted into a tray in the working area. At step 304, a determination is made as to whether any of the trays in any of the bin locations are filled. The step 304 may be a continuous process, making such determination throughout the entire product stream, until completion of the sequencing or sorting of the product. If the determination is affirmative, then the process continues to step 306, at which time any filled trays are placed in a queued area of the bin locations. Steps 302 and 304 may continue processing during step 306, since a new tray will be placed in the working area of the bin location. Additionally, step 306 may be applicable for more than one queued area within a single bin location.

At step 308, a determination is made as to whether a trigger event has occurred. If not, the steps 302-306 continue. However, if a triggering event occurs, then the trays in the queued area of certain bin locations, which meet the criteria of the triggering event and have been qualified, will be ejected onto the fill tray conveyor and then transported onto the recirculating buffer, at step 310. The trays are ejected in sequence. The steps 300-306 may continue processing during the operational phase of step 310.

Once the trays are on the recirculating buffer, the process will again wait for a triggering event and qualification, at step 308 (while steps 300-306 continue, in an embodiment). Upon the occurrence of the triggering event and being qualified, the trays in the queued area of certain bin locations, which meet the criteria of the triggering event and qualification, will be ejected onto the fill tray conveyor and transported to the recirculating buffer, at step 310. The trays are ejected in sequence.

Now, as the previously ejected trays are circulating about the recirculating buffer, the recently ejected trays will merge with the previously ejected trays into a sequenced order at step 312. The steps 300-312 will continue until there is no further product remaining for a sort process; however, the triggering event may change during the last or final sweep, i.e., eject all trays in the working area and the queued area and transport them to the conveyor.

At step 314, the trays are fed back to the feeders. If the feeders do not have the throughput to initially process all of the trays, then at step 316, the trays are diverted to a staging conveyor and re-circulated towards the feeders. The steps of 300-312 may continue processing for a sequencing operational phase. Once the product in the sequencing operational phase is placed in the trays, the trays will then be transported to the output, in sequence at step 318.

While the invention has been described in terms of embodiments, those skilled in the art will recognize that the invention can be practiced with modification within the spirit and scope of the appended claims.

We claim:

1. A method of sequencing trays, comprising the steps of:

during at least one preliminary sweep operation:

directing newly ejected trays from queued bin locations to a first merge location;

diverting staged trays previously ejected from the queued bin locations towards the first merge location;

coordinating movements of the newly ejected trays and the staged trays such that the newly ejected trays are merged with the staged trays at the first merge location, into a sequenced set of trays; and during a final sweep operation:

diverting the sequenced set of trays away from the first merge location and towards a second merge location;

ejecting remaining trays having product therein from working bin locations and the queued bin locations diverting the remaining trays towards the second merge location; and sequencing, in contiguous sequence, the remaining trays and sequenced trays as they pass though the second merge location.

2. The method of claim 1, further comprising providing a triggering event, to eject at different times, respectively, the newly ejected trays, the staged trays and the remaining trays into a flow path prior to the first merge location.

3. The method of claim 2, wherein the triggering event for ejecting the newly ejected trays and the staged trays is different than for ejecting the remaining trays.

4. The method of claim 1, further comprising the step of diverting some of the trays of the contiguous sequenced trays away from a feeder when the feeder is unable to process product with other trays of the contiguous sequenced trays and then leading the trays back to the feeder when the feeder regains the processing ability to process the product therein.

5. The method of claim 1, further comprising repeating the steps of claim 1 for a sequencing operation, and diverting the contiguous sequenced trays to an output.

6. The method of claim 1, further comprising placing product within the newly ejected trays and the staged trays.

7. The method of claim 6, wherein the product is mail pieces.

* * * * *